United States Patent
Maglio

[11] Patent Number: 5,108,606
[45] Date of Patent: Apr. 28, 1992

[54] WATER PURIFICATION DEVICE

[75] Inventor: Alfonse Maglio, River Edge, N.J.

[73] Assignee: Engelhard Corporation, Iselin, N.J.

[21] Appl. No.: 676,057

[22] Filed: Mar. 27, 1991

[51] Int. Cl.⁵ .................. B01D 24/38; B01D 29/88; B01D 35/00
[52] U.S. Cl. .................. 210/418; 210/282; 210/541; 210/542; 210/449
[58] Field of Search .............. 210/418, 419, 282, 288, 210/266, 541, 542, 449; 239/445, 586, 596; 251/206; 261/DIG. 22; 285/8; 137/801

[56] References Cited

U.S. PATENT DOCUMENTS

| | | | |
|---|---|---|---|
| 458,762 | 9/1891 | Charonnat | 239/586 |
| 562,410 | 6/1896 | Moon | 251/206 |
| 721,821 | 3/1903 | Myers | 251/206 |
| 1,082,154 | 12/1913 | Held | 210/418 |
| 3,067,952 | 11/1962 | Aghnides | 285/8 |
| 3,184,064 | 5/1965 | Sampson et al. | 210/282 |
| 3,342,335 | 9/1967 | Gamundi et al. | 210/282 |
| 3,342,340 | 9/1967 | Shindell | 210/282 |
| 3,342,420 | 9/1967 | Roulet et al. | 239/586 |
| 4,147,631 | 4/1979 | Dienes et al. | 210/282 |
| 4,271,015 | 6/1981 | Moore | 210/282 |
| 4,301,009 | 11/1981 | Cook et al. | 210/288 |
| 4,515,692 | 5/1985 | Chandler et al. | 210/288 |
| 4,557,289 | 12/1985 | Kasnick | 251/206 |
| 5,017,286 | 5/1991 | Heiligman | 210/282 |

Primary Examiner—Stanley S. Silverman
Assistant Examiner—Cynthia L. Nessler

[57] ABSTRACT

An in-line water purification system where all the water from a supply to a faucet opening enters a filter cartridge further includes a flow restrictor placed at the end of a faucet and which can be placed in a position so as to reduce water volume through said filtering system to remove the subjective control by the end user of water flow through the filtering device.

5 Claims, 1 Drawing Sheet

WATER PURIFICATION DEVICE

BACKGROUND OF THE INVENTION

The subject matter of the present invention is an improvement in water filtering devices attached to faucets for domestic use.

It has long been proposed that water faucets, such as household water faucets, restaurant, office and other drinking water outlets, be equipped with a water filtering device such that the householder or other user can assure the potability of the water withdrawn from the faucet for drinking or cooking purposes. As far back as 1906 there issued to G. Klumpp U.S. Pat. No. 818,264 disclosing such a device, and in the meantime numerous patents have issued disclosing variations for such devices. However, the fundamental difficulty has been that such filtering device, in order to be practical, must on the one hand effectively filter the water to significantly increase its potability while yet, on the other hand, have a sufficiently long efficient filtering life so as not to require almost constant replacement. Moreover, the devices heretofore proposed have failed to meet a further requisite, namely, that the device be compact, simple of construction and hence economical and be aesthetically pleasing so as to be accepted and used by the consumer.

The problem has been compounded by the fact that as the years have gone by the standards for what would be considered potable water have greatly increased. With the higher the standards has come a greater demand that the filtering devices have a greater filtering efficiency. Accordingly, it has been all the more difficult to attain a relatively long efficient filtering life for the device at a sufficiently low cost so as to render the device economically feasible for the householder or other user. In essence, then, there is need for a water filtering device for attachment to a faucet which at one and the same time provides potable water to today's high standards for potable water, and on a cost basis which is easily within the budget of the average householder.

There are basically four types of drinking water purification systems for home kitchen faucets at present.

An end-of-tap device is designed to fit entirely onto the end of the kitchen faucet. A flow diverter is first screwed onto the faucet followed by a purification chamber filled with active media. When the flow diverter is activated, the water flow is diverted into the purification chamber and purified water is delivered to the sink, either back through the diverter or directly out of the chamber. Typically, pressure drop is built into the system by mechanical restrictions, and the flow is controlled to slow rates. The advantages of the end-of-tap devices are low cost and simple installation. The disadvantages are mechanical limitation to the purification chamber and poor aesthetics.

A counter-top device is essentially a large end-of-tap device and is plumbed the same way. The only difference is that the purification chamber is mounted on the counter top and is connected to the diverter valve with hoses. The water can return to the sink via a separate faucet (integral with the device) or back to the diverter through a second hose. The counter-top device allows for larger canisters, but still has an aesthetic problem. Installation is simple, and cost is moderate.

Third faucet devices are mounted under the sink where there is room to fit even larger purification chambers for more efficient purification. Aesthetics are significantly improved. Water is fed to the purification chamber from a tee mounted in the faucet supply. The purified water is then returned to the sink via an added ("third") faucet. Integral flow restrictors are included to throttle down to low flow for excellent purification capability due to the ability to mount larger systems under the sink. However, the third faucet results in higher cost, more difficult installation, and (to a lesser extent) an aesthetic problem.

In addition, one disadvantage associated with all of the above units is that the water is stagnant in the purification chamber, except when drinking water is desired. If left for extended periods, there is potential to grow bacteria. Manufacturers of all devices deal with this problem by instructing the consumer to flush the device for several minutes if left unused for extended periods.

In-line devices are also mounted under the sink where larger purification chambers can be utilized. These chambers are similar to third faucet systems, however, the plumbing is different. All of the water from the supply line is plumbed directly into the purification chamber and water flow discharges to the sink via the main kitchen faucet. No internal flow restrictors are used, and it is left to the consumer to adjust the flow to achieve good purification. The main advantages of this system is lower cost and simplified installation (compared to third faucet systems) as well as limited stagnation time (compared to all other systems). The main disadvantage is that flow control is subjectively left to the consumer, therefore, extent of purification is uncontrolled. A disadvantage which is consequent to the fact that flow control is subjectively left to the consumer manifests itself in certification testing of purification devices. Thus, the end of tap, counter top and third faucet devices have internal flow restrictors which reduce the flow of water through the filtering device. In-line devices do not have these flow restrictions. Testing protocol does not allow for consumer adjustment of flow through in-line devices such that the unrestricted flow through the filtering device is not sufficient to provide sufficient contamination removal. Thus, although certain in-line devices have excellent removal efficiency upon controlling the flow of water through the device such as made by the end user, such devices may not be certified since the end use flow control is not allowed during testing.

It is an object of the present invention to provide improvements in in-line filter systems for domestic water sources.

It is a further object of this invention to provide improvements in in-line filter systems for domestic water source which maintain the advantages of the in-line system and at the same time removes the subject control of filter efficiency presently placed on the end user.

SUMMARY OF THE INVENTION

In accordance with the present invention, an in-line water purification is provided with a flow restrictor located at the end of the faucet so as to allow the end user to switch between an unrestricted and restricted flow or, unpurified and purified water, respectively. The present invention does not at all change the plumbing of in-line devices wherein all of the water from a supply is plumbed directly into the purification chamber and flows from the purification chamber for discharge to the sink or like via the main faucet. Thus, no internal flow restrictors are used. The end-of-faucet flow restrictor or valve is used in conjunction with water flow control provided on domestic faucets and simply ends the guess work of controlling flow through the filter by the end user. Thus, when the flow restrictor is on, water flow through the purification chamber will be such to ensure efficient filtering of the water supply.

DETAILED DESCRIPTION OF THE INVENTION

Figure 1:
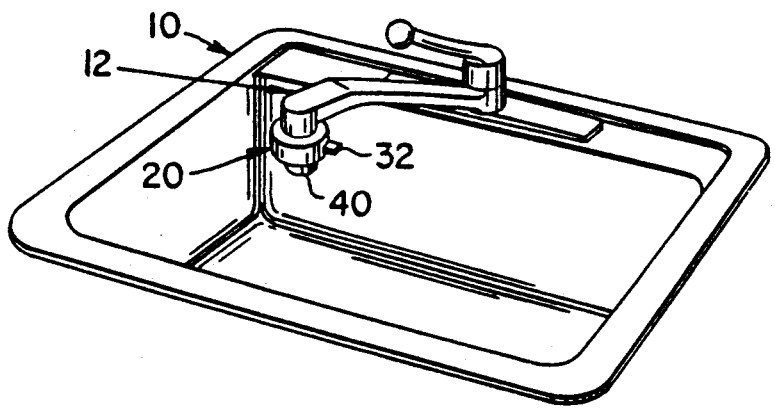
FIG. 1 is a perspective view of a typical household sink.

The end-of-faucet flow restrictor for use in an in-line water purification device cf the present invention has preferred use in domestic faucets. Thus, the flow restrictor of this invention has use in domestic sinks such as indicated by reference numeral 10 in FIG. 1. Domestic sink 10 includes a faucet spout 12 which contains the flow restrictor 20 of the present invention threaded into the end of the faucet spout 12. As typical in domestic sinks, an aerator 40 is attached to the end of faucet spout 12 through flow restrictor 20 as more specifically shown in FIG. 3.

Figure 2:
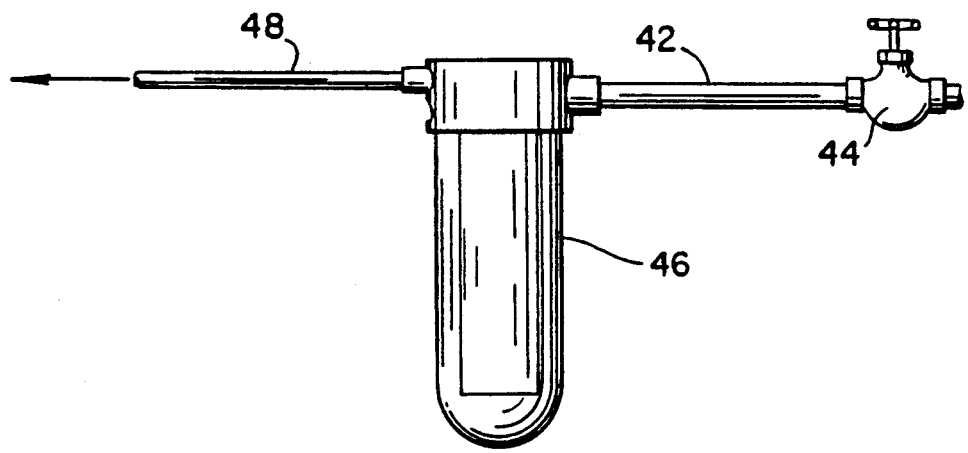
FIG. 2 is an elevational view of a water filter installed as an in-line device on the main water supply line.

Flow restrictor 20 finds use in an in-line filtering device, an example of which is as shown in FIG. 2. As shown in FIG. 2, all the cold water travels through main water line 42 into filter cartridge 46 and then out through the cold water pipe 48. The flow through pipe 48 is then connected to sink 10 by conventional means without further flow restriction to aid in filtering until such flow reaches the end of faucet spout 12. The main water supply is controlled by valve 44. It is important to note that in this preferred embodiment, there is no bypass valve for the household water when filtering is not required. Thus, all the cold water delivered to sink to enters through filter cartridge 46. Filter cartridge 46 can be placed anywhere along the cold water line 42. A typical place would be in the basement area so as to hide the filter cartridge from view, thus, improving the aesthetics of the in-line device relative to other filtering devices wherein the cartridges are placed on the counter top or on the faucet spout itself. It is also preferred to place filter cartridge 46 under the sink. In such another arrangement, all of the water from the hot water line (not shown) enter filter cartridge 46 before flowing from faucet spout 12. Obviously, separate cartridges could be installed on both the hot and cold water lines.

Figure 3:
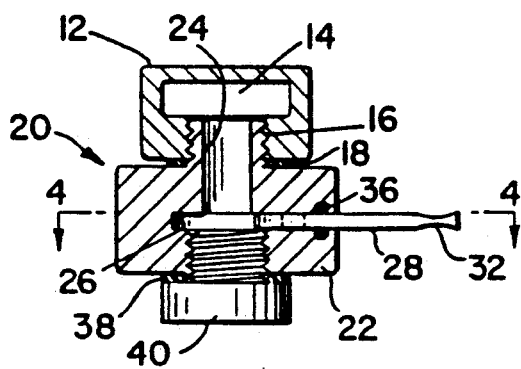
FIG. 3 is a horizontal cross-section through the end of a sink faucet illustrating the water volume restrictor of the present invention.
Figure 4:
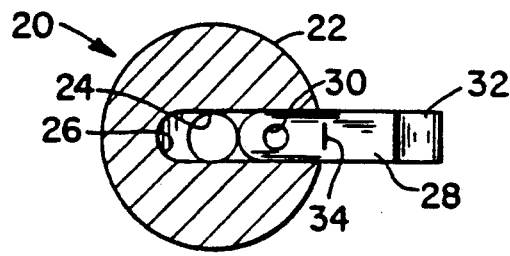
FIG. 4 is a cross-section through the water volume restrictor of FIG. 3 taken along lines 4—4 of FIG. 3.

While aesthetics and economic cost of the in-line water filtering devices are important advantages of this type of filtering system, an important disadvantage is the fact that filtering efficiency is at the subjective control of the user. Thus, only by controlling the water flow volume through faucet spout 12 by manipulation of faucet handle 52, as shown in FIG. 1, is water flow back through the filtering system including filter cartridge 46 controlled. The flow restrictor 20 of the present invention is the means by which the subjective control of the user is eliminated and by which excellent filter efficiency can be assured for the in-line water filtering system. FIGS. 3 and 4 illustrate flow restrictor 20 of the present invention. Flow restrictor 20 is a valve which can be fitted within faucet spout 12 in the threaded opening 16 typically used for insertion of the faucet aerator. Flow restrictor 20 as shown is a slide valve which includes a slide valve body 22 and a water-way 24 which communicates with the water-way 14 in faucet spout 12. Slidingly moveable within valve body 22 is slide member 28 which includes a water restricting opening 30 which restricts the volume of water flowing through water-way 24 when slide member 28 is in the "on" position. Thus, in the "on" position, opening 30 in slide 28 is juxtaposed across water-way 24 to restrict the water flow through the filtering system and provide effective water filtration. Grip 32 allows the end user to easily manipulate slide 28 into the filtering position. Once slide 28 is rested against slide stop 26, water can only flow through the narrow water restriction opening 30. When filtered water is not required, slide 28 can be moved out of position to again allow water to flow unrestricted through water-way 24 in valve body 22. In this manner, regardless of the amount of water chosen by the end user such as through manipulation of sink handle 52, if slide 28 is in the filtering position, the flow of water will be restricted back through the filtering system including filter cartridge 46 to allow efficient water filtration. The flow restrictor device of the present invention which is threaded into the aerator threaded opening 16 can also include seals 18 and 36. Aerator 40 can be threaded into threaded openings in slide valve body 22. Seals 38 can be attached to eliminate water leakage. Also shown in FIG. 4 is an indicator 34 which can illustrate to the end user when the valve is in the open position allowing unrestricted water flow.

While FIGS. 3 and 4 clearly illustrate a useful flow restrictor, the present invention is not to be limited to the specific structure shown in the drawings as other equivalent structures which allow the end user to control the filtering capability of an in-line device by an "on" and "off" valve can be used. Thus, the flow restrictor of the present invention is to be only limited by the following claims.

What is claimed:

1. In a water purification system of the in-line type comprising a water faucet containing a faucet handle controllable by the end user to control the volume of water through said faucet, a water supply connected to said faucet and a water filtering cartridge containing a filtering medium to remove impurities from water and interposed between said faucet and said water supply such that all the water passing from said supply to said faucet must pass through said filtering cartridge, the improvement which comprises an additional flow restrictor attached to said faucet between said faucet handle and the end of said faucet, said flow restrictor including means to reduce the volume of water passing through said faucet and the water purification system, said flow restrictor including means to position said water volume reducer means to a location to reduce water flow through said faucet and to a location wherein water flow is not restricted through said faucet without removing said flow restrictor from said faucet.

2. The water purification system of claim 1 wherein said flow restrictor is placed at the end of said faucet.

3. The water purification system of claim 2 wherein said flow restrictor is threaded into the end of said faucet.

4. The water purification system of claim 2 wherein said water volume reducer means is an orifice and said position means is a sliding member containing orifice, said sliding member being slidable to a location to juxtapose said orifice across said faucet and to a location such that said orifice is out of juxtaposition with said faucet.

5. The water purification system of claim 4 wherein said sliding member includes a grip means to allow the end user to manually position said sliding member.

* * * * *